US010401961B2

(12) United States Patent
Cruz-Hernandez et al.

(10) Patent No.: US 10,401,961 B2
(45) Date of Patent: Sep. 3, 2019

(54) METHOD AND APPARATUS FOR GENERATING HAPTIC EFFECTS USING ACTUATORS

(75) Inventors: Juan Manuel Cruz-Hernandez, Montreal (CA); Danny A. Grant, Laval (CA); Robert W. Heubel, San Leandro, CA (US)

(73) Assignee: IMMERSION CORPORATION, San Jose, CA (US)

( * ) Notice: Subject to any disclaimer, the term of this patent is extended or adjusted under 35 U.S.C. 154(b) by 1199 days.

(21) Appl. No.: 12/481,030

(22) Filed: Jun. 9, 2009

(65) Prior Publication Data

US 2010/0309142 A1    Dec. 9, 2010

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC ... G06F 3/016; G06F 3/041; H01H 2003/008; H01H 2215/00; H04R 2400/03
USPC ...................................................... 345/173
See application file for complete search history.

(56) References Cited

U.S. PATENT DOCUMENTS

| 5,959,613 | A * | 9/1999 | Rosenberg | .............. | A63F 13/06 |
| | | | | | 341/20 |
| 2003/0067449 | A1 * | 4/2003 | Yoshikawa | ............. | G06F 3/016 |
| | | | | | 345/173 |
| 2004/0056840 | A1 * | 3/2004 | Goldenberg | ............ | A63F 13/06 |
| | | | | | 345/156 |
| 2005/0057528 | A1 | 3/2005 | Kleen | | |
| 2005/0134562 | A1 * | 6/2005 | Grant | ...................... | G06F 3/016 |
| | | | | | 345/161 |
| 2005/0243072 | A1 | 11/2005 | Denoue et al. | | |
| 2006/0017691 | A1 * | 1/2006 | Cruz-Hernandez | ..... | G06F 3/016 |
| | | | | | 345/156 |
| 2006/0050059 | A1 * | 3/2006 | Satoh | ...................... | G06F 3/016 |
| | | | | | 345/173 |
| 2006/0119573 | A1 * | 6/2006 | Grant | .................... | B06B 1/0215 |
| | | | | | 345/156 |

(Continued)

FOREIGN PATENT DOCUMENTS

| CN | 1 459 072 | 11/2003 |
| CN | 1 531 704 | 9/2004 |

(Continued)

OTHER PUBLICATIONS

Extended Search Report, including the Search Opinion, issued for European Patent Application No. 10165309.5, dated May 8, 2014.

(Continued)

*Primary Examiner* — Patrick N Edouard
*Assistant Examiner* — Douglas M Wilson
(74) *Attorney, Agent, or Firm* — Medler Ferro Woodhouse & Mills PLLC

(57) ABSTRACT

A method and apparatus of actuator control mechanisms for haptic effects are disclosed. The apparatus can include an actuator and a controller for controlling a haptic cell. Depending on the type of haptic effect desired, as well as the damping characteristics of the system, the controller can generate a kick-in pulse followed by a main pulse to create an increased acceleration response, and/or a breaking pulse to provide a damping effect for a short mechanical type of haptic effect.

18 Claims, 14 Drawing Sheets

(56) References Cited

U.S. PATENT DOCUMENTS

| | | | |
|---|---|---|---|
| 2006/0256075 A1* | 11/2006 | Anastas | G06F 3/016 345/156 |
| 2006/0290662 A1 | 12/2006 | Houston et al. | |
| 2007/0202841 A1 | 8/2007 | Cruz-Hernandez et al. | |
| 2008/0084384 A1 | 4/2008 | Gregorio et al. | |
| 2008/0100177 A1 | 5/2008 | Dai et al. | |
| 2008/0111788 A1* | 5/2008 | Rosenberg | A63F 13/06 345/156 |
| 2008/0117175 A1* | 5/2008 | Linjama | G06F 3/016 345/173 |
| 2008/0198139 A1 | 8/2008 | Lacroix et al. | |
| 2008/0251364 A1* | 10/2008 | Takala | G06F 3/01 200/341 |
| 2009/0009481 A1 | 1/2009 | Yatsu et al. | |
| 2009/0072662 A1 | 3/2009 | Sadler et al. | |
| 2010/0259368 A1* | 10/2010 | Fahn | G06F 3/041 340/384.1 |

FOREIGN PATENT DOCUMENTS

| | | |
|---|---|---|
| CN | 1 585 922 | 2/2005 |
| CN | 1 875 335 | 12/2006 |
| EP | 0 789 321 A2 | 8/1997 |
| EP | 0789321 | 8/1997 |
| EP | 1 923 774 | 5/2008 |
| EP | 1923774 | 5/2008 |
| WO | 2006/071449 | 7/2006 |
| WO | 2006/071449 A1 | 7/2006 |

OTHER PUBLICATIONS

Notification of the Second Office Action issued in Chinese Patent Application No. CN 201010242580.7, dated Sep. 5, 2014.
Chinese Office Action issued by SIPO in Chinese Application No. 201510107431.2, dated Mar. 29, 2017.
Extended European Search Report issued in EP 10165309.5, dated May 8, 2014.
Extended European Search Report issued in EP 10165310.3, dated Mar. 2, 2011.
Notice of Allowance for U.S. Appl. No. 12/481,024, dated Oct. 4, 2017.
Notification of Second Office Action issued in Chinese Patent Appl. No. 201010242580.7, dated Sep. 5, 2014.
Partial Search Report issued in European Patent Application No. 10165310.3, dated Sep. 9, 2010.
Office Actions issued for U.S. Appl. No. 12/481,024 between Dec. 2011 and Jun. 2017.
Supplemental Notice of Allowability for U.S. Appl. 12/481,024, dated Jan. 5, 2018.

* cited by examiner

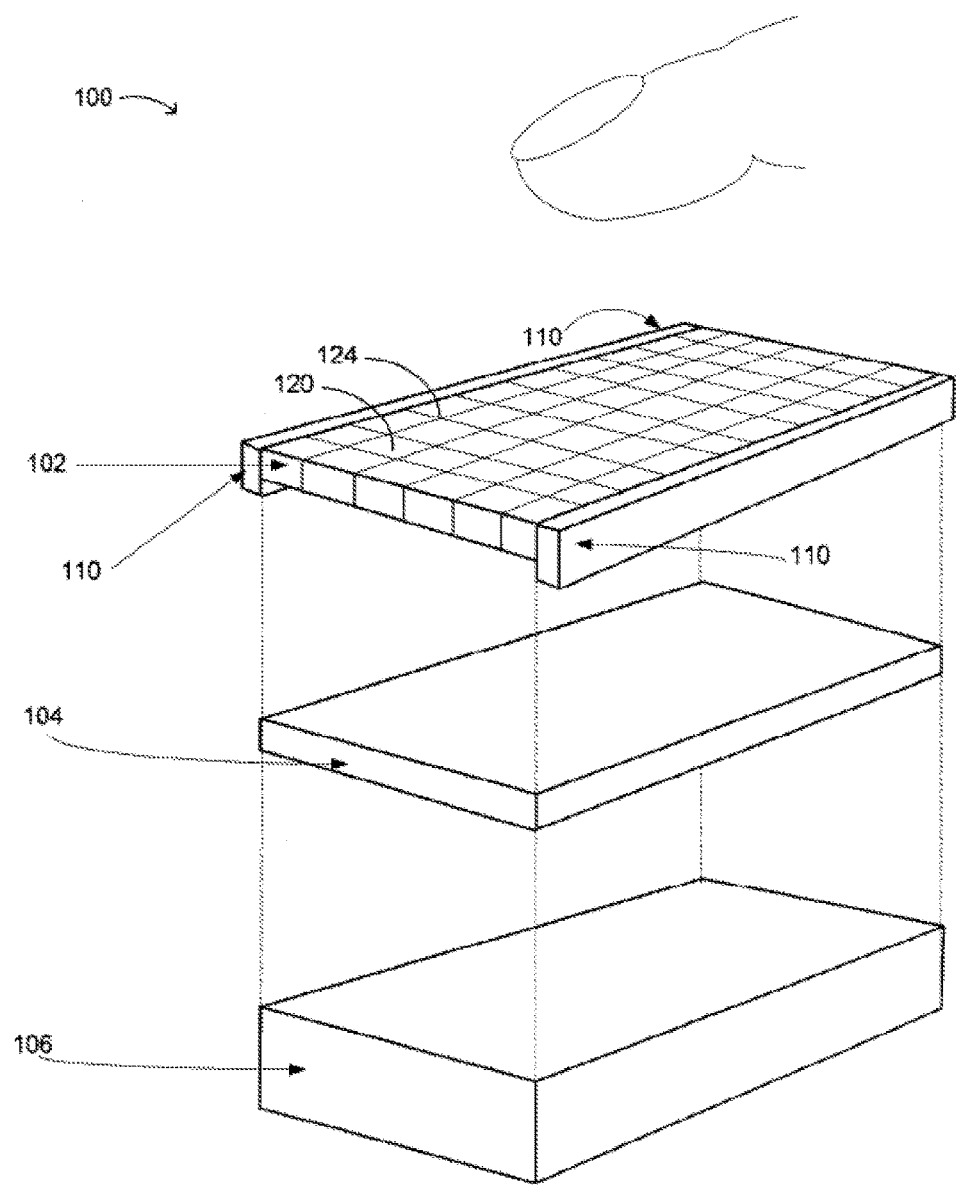
FIG. 1
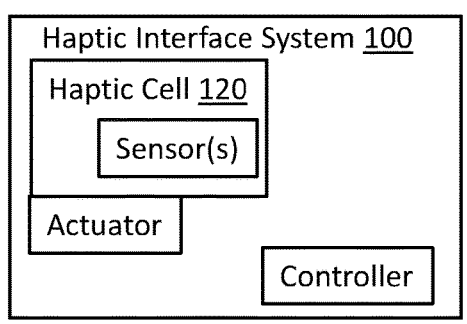
Haptic Interface System 100
Haptic Cell 120
Sensor(s)
Actuator
Controller

METHOD AND APPARATUS FOR GENERATING HAPTIC EFFECTS USING ACTUATORS

FIELD OF THE INVENTION

The present invention relates to the field of electronic interface devices. More specifically, the present invention relates to haptic interface device.

BACKGROUND OF THE INVENTION

As computer-based systems, appliances, automated teller machines (ATM), point of sale terminals and the like become more prevalent, the ease of use of the human-machine interface is becoming more and more important. Such interfaces should operate intuitively and require little or no training so that they may be used by virtually anyone. Many conventional user interface devices are available on the market, such as key board, mouse, joystick, and touch screen. One of the most intuitive and interactive interface devices known is the touch panel, which can be a touch screen or a touch pad.

A touch screen includes a touch sensitive input panel and a display device, usually in a sandwich structure and provides a user with a machine interface through touching a panel sensitive to the user's touch and displaying content that the user "touches." A conventional touch pad is a small planar rectangular pad, which can be installed near a display, on a computer, an automobile, ATM machines, and the like. A conventional touch-sensitive component of a touch panel employs various types of touch sensing technology such as capacitive sensors, pressure sensors and the like as known in the art to detect locations being pressed on the panel. For example, a user contacts a region of a touch screen commonly with a fingertip to emulate a button press and/or moves his or her finger on the panel according to the graphics displayed behind the panel on the display device.

A problem associated with a conventional touch sensitive input panel is the delay tactile effect. For instance, a typical actuator generally takes some time to reach full vibrating tactile effect. Similarly, a conventional actuator usually takes some time to stop a vibrating effect as well.

SUMMARY OF THE INVENTION

A control method and apparatus for actuators suitable for a multi-touch tactile touch panel are disclosed. The apparatus can include an actuator and controller for controlling a haptic cell. Depending on a particular type of haptic effect that is desired, as well as the damping characteristics of the system, the controller can generate a brake pulse and/or kick-in pulse followed by a main pulse to create an increased acceleration response, and/or a braking pulse to provide a damping effect for a short mechanical type of haptic effect.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates an example of haptic interface or system capable of providing crisp tactile feedbacks using actuator(s) in accordance with one exemplary embodiment of the present invention;

DETAILED DESCRIPTION

Figure 2:
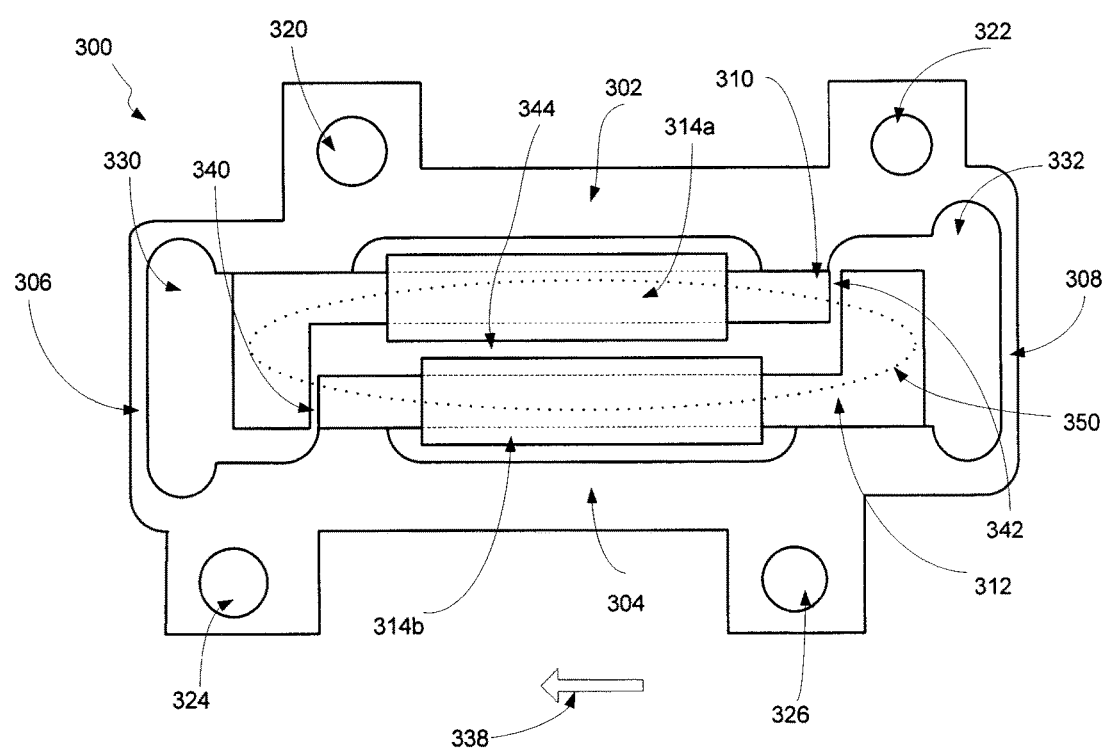
FIG. 2 illustrates an actuator capable of generating crisp haptic effects using a relay mechanism in accordance with exemplary embodiment(s) of the present invention.

Embodiments of the present invention are described herein in the context of a method, system and apparatus of actuator control for a multi-touch tactile touch panel. Those of ordinary skills in the art will realize that the following detailed description of the present invention is illustrative only and is not intended to be in any way limiting. Other embodiments of the present invention will readily suggest themselves to such skilled persons having the benefit of this disclosure.

Reference will now be made in detail to the implementations of the exemplary embodiments of present invention as illustrated in the accompanying drawings. The same referenced indicators will be used throughout the drawings and the following detailed description to refer to the same or like parts.

In the interest of clarity, not all of the standard hardware and routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a developmental effort might be complex and time-consuming, but would nevertheless be a routine undertaking of engineering for those of ordinary skills in the art having the benefit of this disclosure.

The exemplary embodiments of the present invention disclose actuators suitable for use in multi-touch actuator touch panels to generate a wide rage of haptic feedback effects. Among these effects, a crisp haptic feedback can be generated, which is an enhanced distinctive haptic feedback, which, for instance, is capable of reaching full haptic capacity more quickly or stopping a haptic effect more abruptly. For example, an interface device having a sensor (e.g., a touch sensitive surface, touch panel, etc.) may be capable of providing multiple haptic feedbacks in response to multiple contacts simultaneously, when enabled with haptic effects. Such haptic feedback via a touch sensitive surface may also be referred to as tactile effect, tactile feedback, haptic effect, force feedback, or vibrotactile feedback. The tactile touch panel can also be referred to as a haptic touch pad, vibrotactile touch panel, force feedback touch panel, haptic touch panel, or the like.

An actuator, in one embodiment, can be made of a coil, a central object (e.g., a metal), and a spring. The coil may be wrapped around the metal (where both coil and metal parts may be referred to as a "solenoid"), and where the metal moves when the coil produces a magnetic field (e.g., when a current is passed through the coil terminals). The spring may then be used to bring back the moving metal or other central object to a resting position when the current is removed from the coil.

For example, while the actuator may be powered and controlled via unidirectional current and/or voltage, the spring can enable a metal moving part to return to a resting position when the power (e.g., unidirectional voltage) is removed. The response time, bandwidth, and other actuator features can depend on a force produced by the solenoid and the spring constant. For example, relay systems for generating tactile cues may have characteristics of generating relatively high forces with relatively small displacements (e.g., central object displacement of less than about 0.5 mm). Further, an inherent resonant frequency can be associated with the actuator, and physical characteristics (e.g., a central object mass, spring characteristics, etc.).

For haptic applications, different types of actuators, such as "closing" actuators and "releasing" actuators, can be utilized. In closing actuators, a solenoid produces a force higher than the force stored in the spring when fully compressed. Part of the haptic effect occurs when this actuator reaches its full capacity and produces a collision, and such collision usually produces the highest acceleration value in the actuator. In releasing actuators, a solenoid produces a force that might be smaller than or equal to the force accumulated in the spring when fully compressed. Here, the solenoid may be used to compress the spring, which when released can produce the desired haptic effect.

In one embodiment, a haptic process deploying an actuator for generating crisp haptic feedback is configured to monitor an input pulse in accordance with a contact. For instance, the contact may occur when a user's finger depresses a tactile touch pad. Upon detecting an input pulse, the process initiates an actuator in response to the input pulse. After generating an output pulse in accordance with the input pulse for generating haptic feedback, the process produces a kick-in pulse capable of increasing peak to peak acceleration value to enhance the sensation of haptic feedback. Alternatively, the haptic process can further generate a brake pulse to assist stopping vibration of an actuator.

FIG. 1 illustrates an example of haptic interface or system 100 capable of providing crisp tactile feedbacks using actuator(s) in accordance with one exemplary embodiment of the present invention. System 100 includes a touch-sensitive panel or touch panel 102, a display panel 104, and a case 106. Touch-sensitive panel 102, in one example, is made of substantially transparent materials, and is capable of transmitting light so that objects or images displayed in display 104 can be seen through the touch-sensitive panel 102. Touch-sensitive panel 102 can include an insulated layer and an array or a grid of independently controllable haptic cells 120, where haptic cells 120 are separated by borders 124. Display 104 can be any type of display such as a cathode ray tube (CRT), liquid crystal display (LCD), plasma display, flat panel display, flexible display or the like. Both touch-sensitive panel 102 and display 104 may be installed together with case 106 and/or integrated into the same unit or device. In some applications, display 104 may be removed from system 100 when displaying images are not necessary. For example, a touch pad used on a laptop or on a vehicle dashboard, which does not require displaying images, can be opaque. It should be further noted that the underlying concept of the exemplary embodiment of the present invention would not change if one or more blocks (circuits or layers) were added to or removed from system 100.

FIG. 2 illustrates an example of actuator 300 capable of generating crisp haptic effects using an actuator in accordance with exemplary embodiment(s) of the present invention. Actuator 300 includes two L-shaped pole pieces 310-312, first and second structural elements 302-304, and first and second biasing elements 306-308. Pole pieces 310-312 may be made of standard magnetic steels with high permeability or other suitable ferromagnetic materials such as soft magnetic materials with high magnetic permeability (e.g., iron, nickel, magnetic alloys). Pole pieces 310-312 need not be made of the same material and they are further coupled to coils 314a, 314b to form electromagnetic devices ("magnetic device"). In another embodiment, one of the pole pieces need not include a coil as long as it is formed of a ferromagnetic material.

Actuator 300 includes structural elements 302, 304 and first and second biasing elements 306, 308 to form a frame for the actuator 300. First structural element 302, as shown in FIG. 2, includes apertures 320-322, which are coupled or fastened to a housing, a display or a touch-sensitive panel. Similarly, structural element 304 also contains apertures 324, 326 for similar coupling. Biasing elements 306, 308, which may be springs, flexure springs, flexible blades, flexible members, elastomeric components, foam components, and the like, are made of elastic or relatively flexible materials that can be compressed and/or stretched within a predefined range Referring again to FIG. 2, pole pieces 310 and 312 are coupled to structural elements 302 and 304, respectively. Pole piece 310 is placed adjacent to pole piece 312 with three magnetic gaps 340, 342 and 344 between the pole pieces 310, 312. The width of gaps 340, 342 is in one embodiment, in a range of about 0.25 to about 0.75 mm. Air pockets 330, 332, which can be of any shape, provide space for pole pieces 310, 312 to move. Because gaps 340, 342 are much smaller than gap 344 the attractive magnetic force at gaps 340, 342 dominates over any attractive force across gap 344.

In operation, biasing elements 306, 308 provide minimal force if there is no current passing through coils 314 and the actuator is (accordingly) in a relaxed state. Under this no power condition, the actuator attains a first equilibrium position as shown, for example, in FIG. 2. When power is applied to coil(s) 314a-314b, an input current passes through the coil(s) creating magnetic flux lines 350 in pole pieces 310-312 and across gaps 340-342. This process generates an attractive force or attractive magnetic force between pole pieces 310-312 when the coils are wound so that the electromagnetic effects do not cancel one another. The term attractive force and attractive magnetic force are used interchangeably herein. The attractive magnetic force acts against biasing elements 306-308 and pulls pole pieces 310-312 closer together at gaps 340-342. In accordance with the embodiment shown in FIG. 2, under the attractive magnetic force, with structural element 302 held fixed, pole piece 312 moves in a direction from right to left (as indicated by arrow 338) toward pole piece 310. Pole piece 310, in this embodiment, may be fastened or secured to structural element 302, which may be further secured to a housing, touch-sensitive panel or display device. When one of pole pieces 310-312 is displaced enough distance within gaps 340-342, a second equilibrium position is reached as increasing spring force is applied in an opposite direction by biasing elements 306-308. When power is then reduced or removed, the biasing elements 306-308 force pole pieces 310-312 back to their original no-power position, also known as the first equilibrium position as described earlier. Described herein are techniques that can be used to control actuators for generation of haptic effects, and that may also be combined with other techniques to generate other haptic effects.

Figure 3:
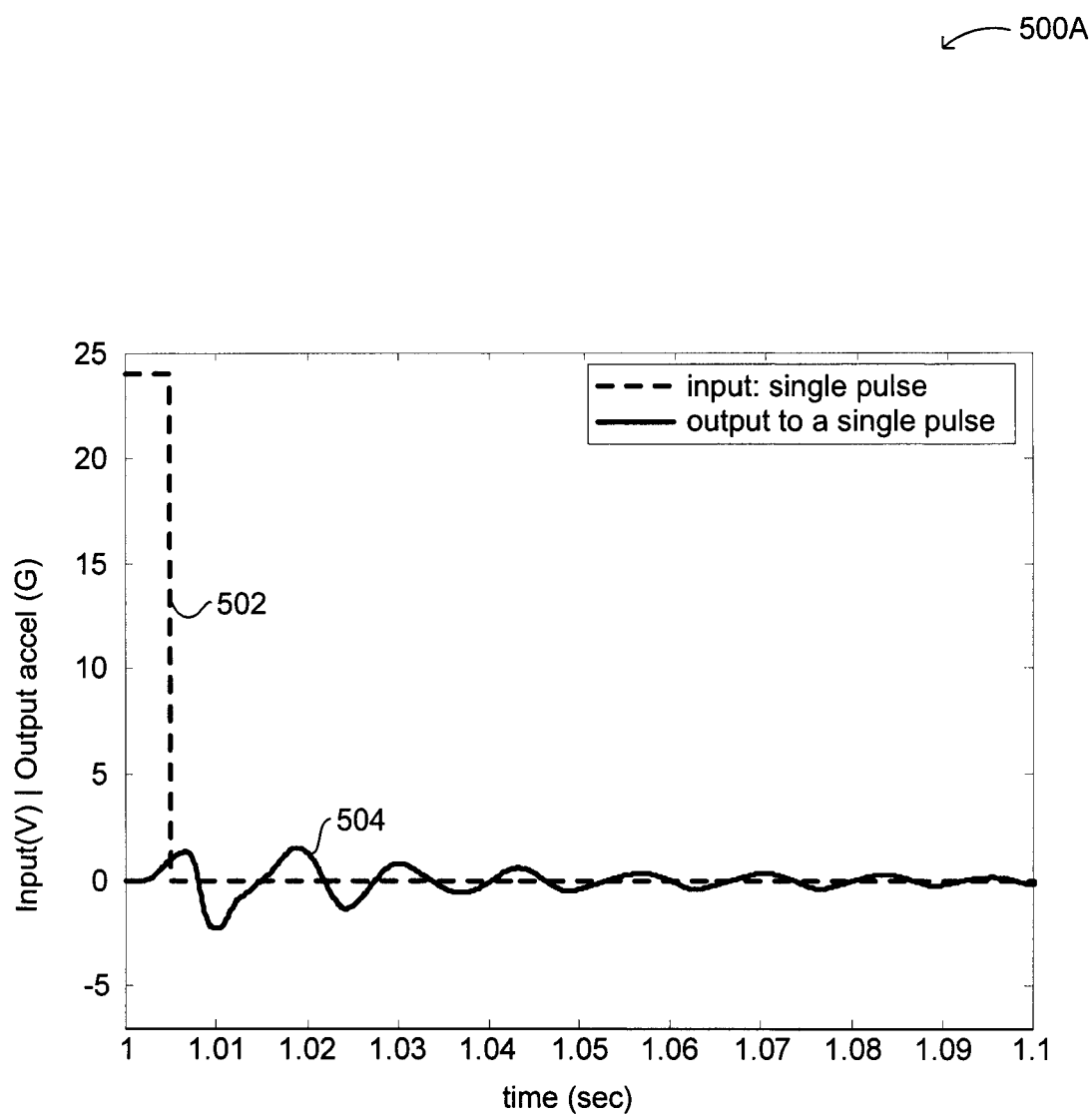
FIGS. 3-5 illustrate graphical representations of a kick-in pulse for actuators in accordance with one exemplary embodiment of the present invention.
Figure 4:
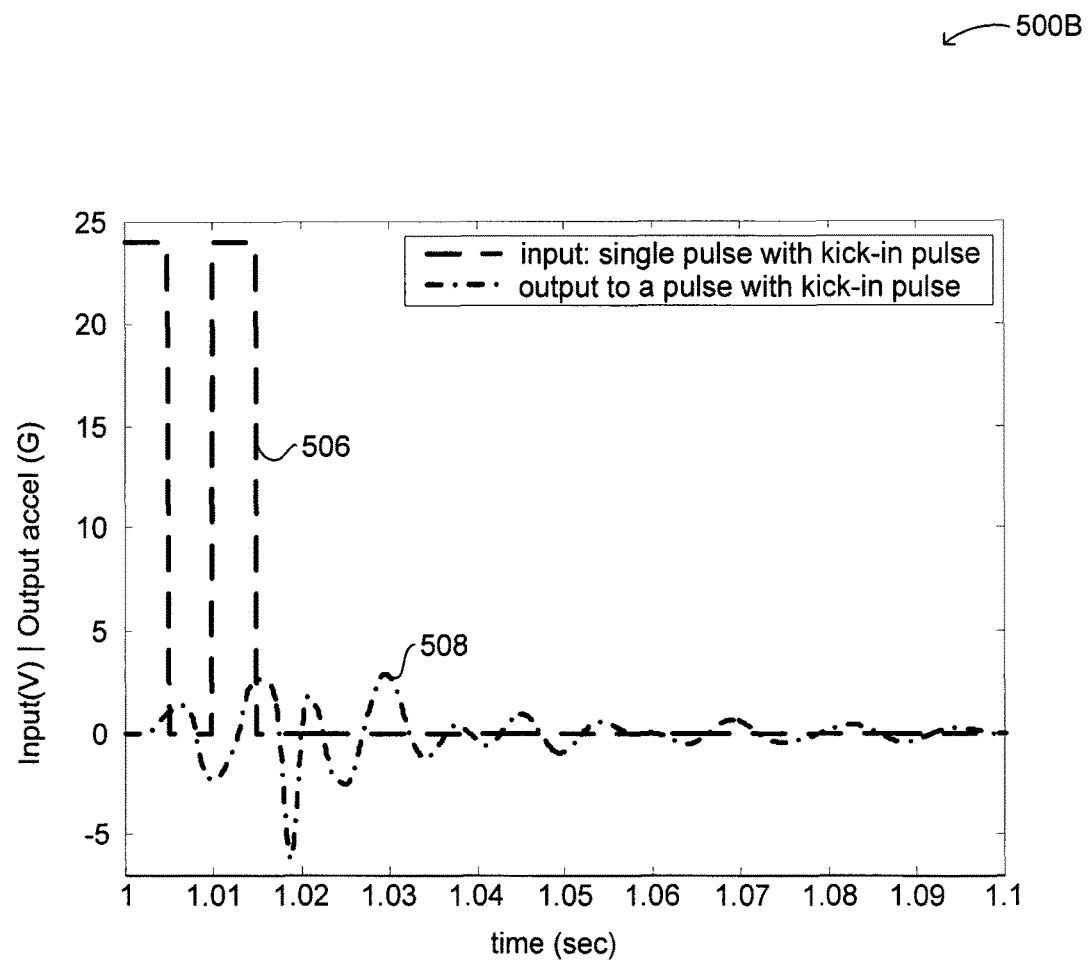
Figure 5:
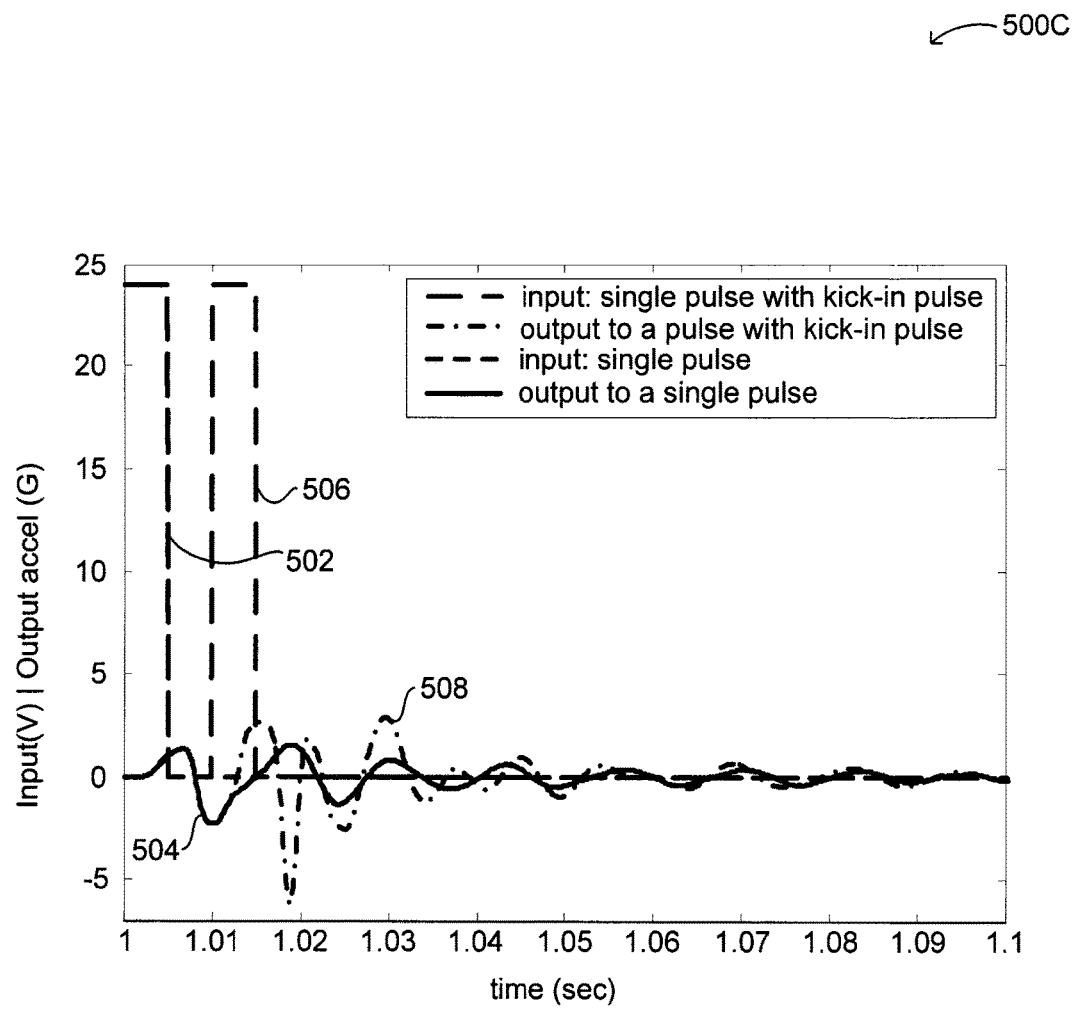

In particular exemplary embodiments, a "kick-in" pulse, which is a pulse that is provided before a main pulse, can be used for increasing a resulting peak-to-peak acceleration value. Alternatively, depending on applications, a kick-in pulse can also be applied after an input pulse. Referring to FIGS. 3-5, shown are graphical representations of an example of kick-in pulse operation for actuators in accordance with exemplary embodiments of the present invention. Further, while particular embodiments are described using actuator examples, other types of actuators (e.g., piezo actuators) can also be used in some cases.

In FIG. 3, a single control signal pulse 502 is shown, along with an associated output acceleration 504. For example, signal pulse 502 may rise from a low level of about 0 V to a high level of about 24 V (e.g., a driving voltage), and be discharged after being maintained at the high level for about 5 ms. Further, a duty cycle of signal pulse 502 may be about 50%, followed by an extended low level. A certain magnitude of force or acceleration in output 504 resulting from an actuator closing (e.g., when signal 502 is high) and releasing (e.g., when signal 502 is low) is thus obtained.

A stronger effect on an output may result from two sequential pulses, as shown in FIG. 4. Here, an actuator control signal 506 may be pulsed twice in succession (a kick-in pulse followed by a main pulse) to give an output signal acceleration 508 as shown. For example, each pulse in control signal 506 may rise from a low level of about 0 V to a high level of about 24 V, and be discharged after being maintained at the high level for about 5 ms. Further, a duty cycle for each of these pulse cycles may be about 50%, and a period may be about 10 ms, followed by an extended low level. However, any suitable low levels, high levels, and/or duty cycles can be accommodated in particular embodiments. FIG. 5 shows a comparison of the peak-to-peak acceleration of output 508 (resulting from the kick-in pulse plus the main pulse), which is greater than a corresponding peak-to-peak acceleration of output 504 (resulting from a single pulse).

Depending on the particular haptic effects that are desired, one, two, or more than two control signal pulses for an associated actuator can be utilized. Using more than two pulses can result in a more distinct, sustained, or longer haptic sensation, or a palette of different sensations, as opposed to a relatively short or crisp mechanical type of sensation. In particular embodiments, relatively sharp haptic effects that essentially replicate a feel of mechanical buttons can be attained by using two control signal pulses, as shown in FIG. 4. Also as discussed, different duty cycles, voltage levels, and/or waveform shapes can be used for actuator control signals to provide different haptic effects.

In operation, the control signal pulse can cause an actuator to close and release, thus providing a force. Particular embodiments can drive two pulses (e.g., of control signal 506 of FIG. 4) at substantially the same resonance frequency. The resonance frequency may be related to the mass with a spring in an associated actuator. Control signal pulsing at this resonance frequency can yield a stronger acceleration, as compared to a larger magnitude pulse that is not operative at the resonant frequency. Essentially, a first pulse of the control signal makes the metal mass in an actuator move, and subsequently, the mass begins to return to a resting position. The second pulse can be activated prior to attainment of a full return to this resting position to speed up acceleration of the mass.

In particular embodiments, multiple voltage sources can be utilized in some cases for the actuator control signals. For example, a first (kick-in) pulse can have an amplitude of about 24 V, and the second (main) pulse can have a maximum amplitude in a range of from about 30 V to about 50 V, or more particularly about 40 V, for relatively short periods of time (e.g., from about 1 ms to about 3 ms), and then be reduced to about 24 V from about 5 ms to about 10 ms. In this particular example, a system resonance would not necessarily be used in order to generate associated sharper haptic effects.

Figure 6A:
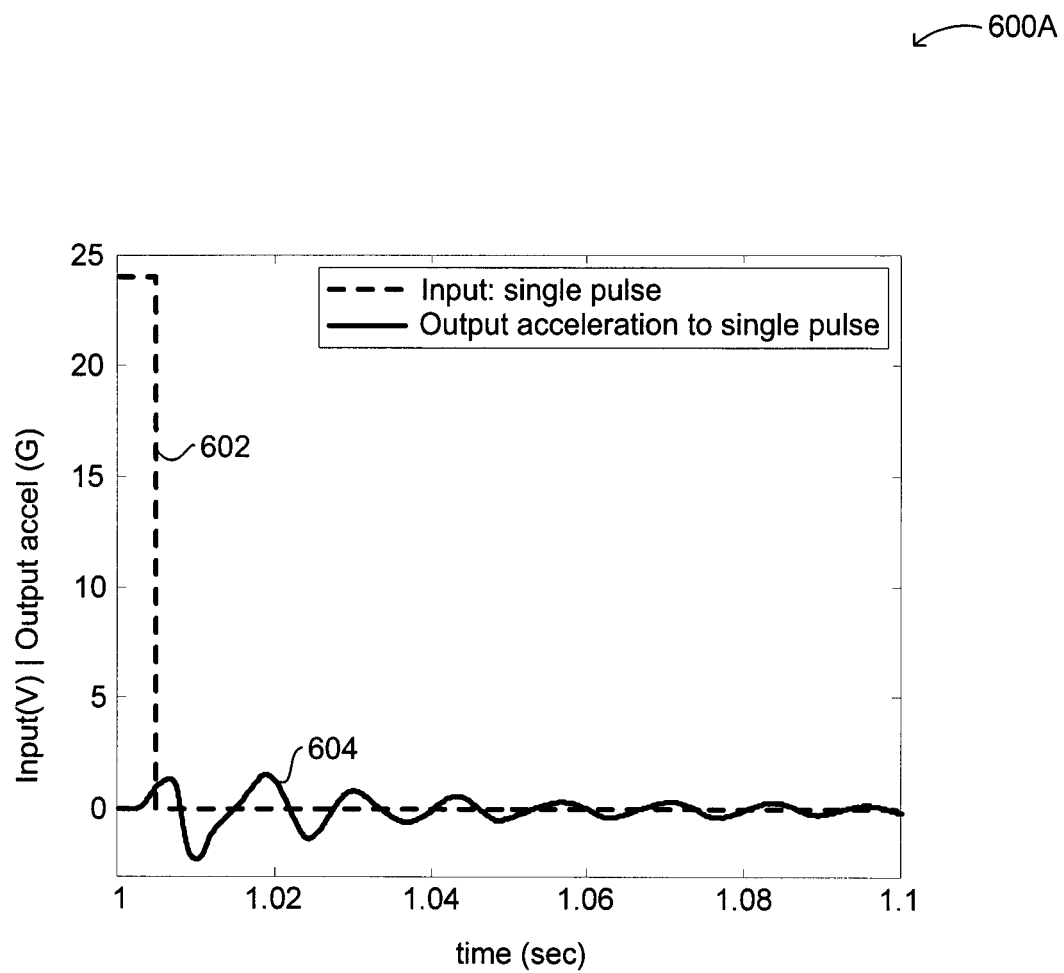
FIGS. 6(A-C) illustrate graphical representations of a pulse with brake operation for actuators in accordance with one exemplary embodiment of the present invention.

FIG. 6(A-C) shows a graphical representation of an example of pulse with brake operation for actuators in accordance with exemplary embodiments of the present invention. An actuator, and therefore some under-damped systems, might have a resonant response with relatively little damping to stop an oscillating output. As a result, the system acceleration response (e.g., output 604 of FIG. 6A), when the control signal input has been removed from the actuator (e.g., control signal pulse 602 is brought low), may continue to oscillate for some time (e.g., about 100 ms). In order to generate sharp single mechanical click effects with this type of actuator, a continuous oscillation response should be appropriately damped or otherwise stopped.

Figure 6B:
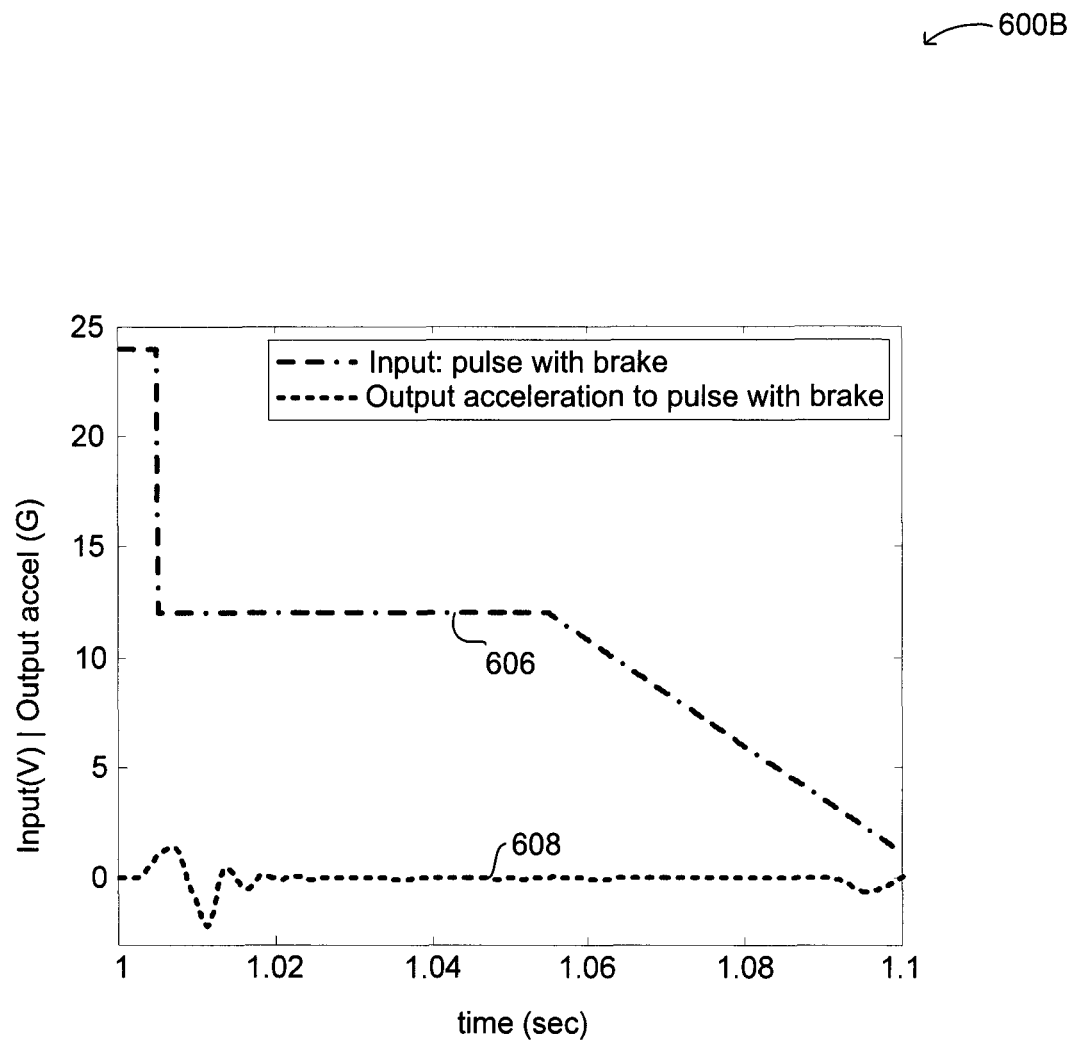
Figure 6C:
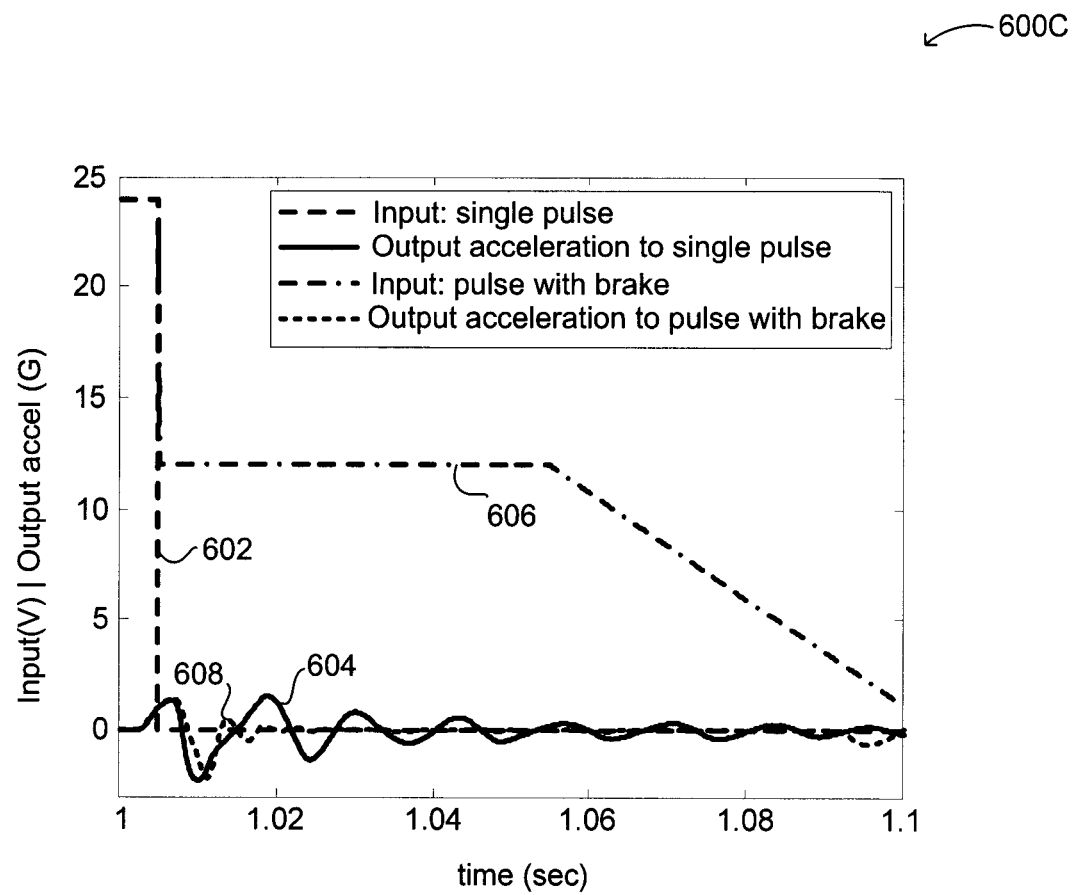

As shown in FIG. 6B, a control signal pulse can be followed by a "brake" pulse portion, as indicated in control signal 606. An acceleration response 608 can thus include no oscillations after an initial oscillation (e.g., having a duration of less than about 20 ms), as shown. FIG. 6C shows that a first pulse can compress the spring of the actuator, and where no brake effect is employed (e.g., control signal 602), the spring can release when the pulse is removed (signal 602 is discharged), thus generating the oscillation (e.g., output acceleration 604) that is naturally found when releasing the spring. However, when an actuator control signal input employs a braking pulse portion (e.g., control signal 606), the spring can be released prior to being allowed to return to an original or resting position. In this fashion, the brake pulse can essentially hold the spring, thus absorbing the oscillations.

A final ramp down of the control signal 606 can return the actuator spring relatively slowly back to a resting position. For example, control signal 606 can be held at a level of about 12 V for about 50 ms, prior to ramping down (e.g., at a slew rate of from about 0.2 V/ms to about 0.3 V/ms, such as about 0.24 V/ms). As a result, a single oscillation (e.g., output acceleration 608) can occur for a relatively short (e.g., about 20 ms) and sharp haptic effect. Further, while particular embodiments are described using actuator examples, other types of actuators (e.g., LRA) can also be used in some cases. Also, other shapes and/or slew rates, as well as voltage levels and durations thereof, can be utilized for control signal 606. In particular embodiments, such a brake effect can be used to remove any suitable un-damped or under-damped response produced by other haptic effects. Thus for example, this brake effect can be combined with the kick-in approach described above with reference to FIGS. 3-5 to give a relatively short, sharp, and damped output with a relatively high peak-to-peak acceleration.

Figure 12:
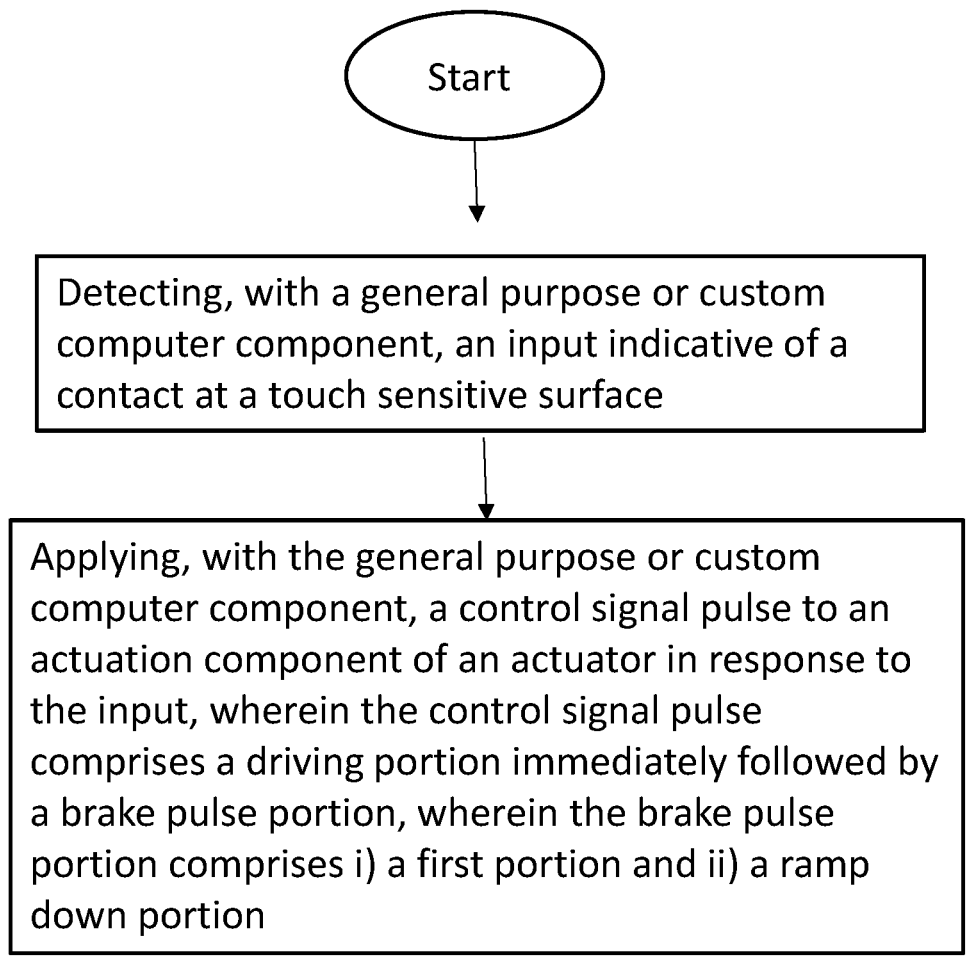

An actuator device should be closed in order to get a relatively sharp acceleration, and using this braking approach, the device is then released relatively slowly to provide a sharp haptic effect. An overall haptic effect (e.g., from output acceleration 608) is to create a relatively short (e.g., about 20 ms in duration) mechanical pulse or click to give a mechanical feeling effect, as opposed to a long "buzz" feel (e.g., of about 100 ms of output acceleration 604). For example, input control signal pulse 606 can have a high magnitude of about 24 V for about 5 ms to close the actuator, in which the actuator is released relatively slowly (e.g., by reducing to a level of about 12 V, and then a ramp down portion) to substantially avoid a potentially long buzz feeling haptic effect as illustrated in FIGS. 6B, 6C, and 12.

Figure 7:
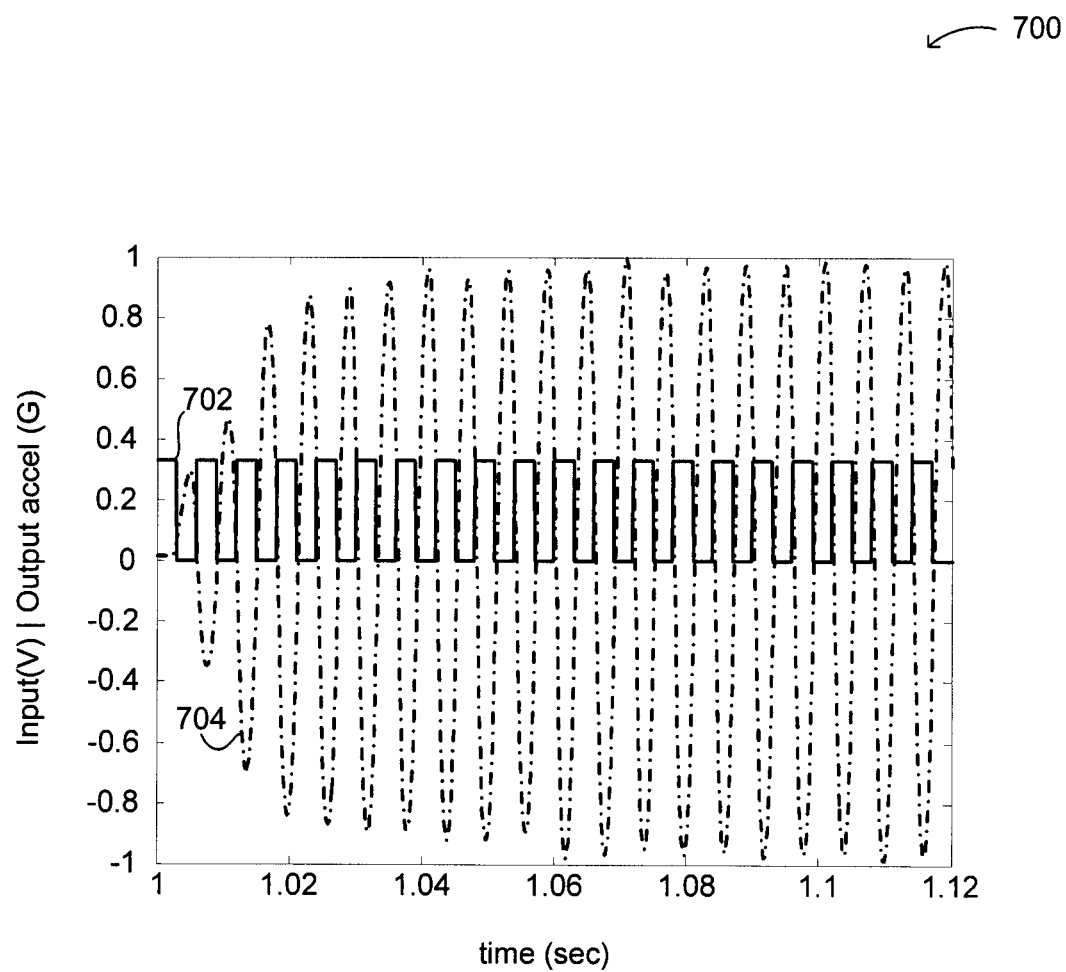
FIG. 7 illustrates a graphical representation of an oscillatory actuator response in accordance with one exemplary embodiment of the present invention.

FIG. 7 shows a graphical representation of an example of oscillatory actuator response in accordance with embodiments of the present invention. In this example, a resonant system where the output acceleration 704 increases with an input control signal 702 that has more than one oscillation. Thus, the system builds up momentum over time to increase the acceleration signal up to a predetermined limit (e.g., about ±1 G). Thus in FIG. 7, system response (704) to an oscillatory control signal input (702) may increase over time as more oscillations (pulses) are input to the system. Also as shown, from the first pulse to the second pulse of control signal 702, output acceleration 704 increases, which is similar to the response discussed above with reference to FIG. 4 (a main pulse preceded by a kick-in pulse).

Figure 8:
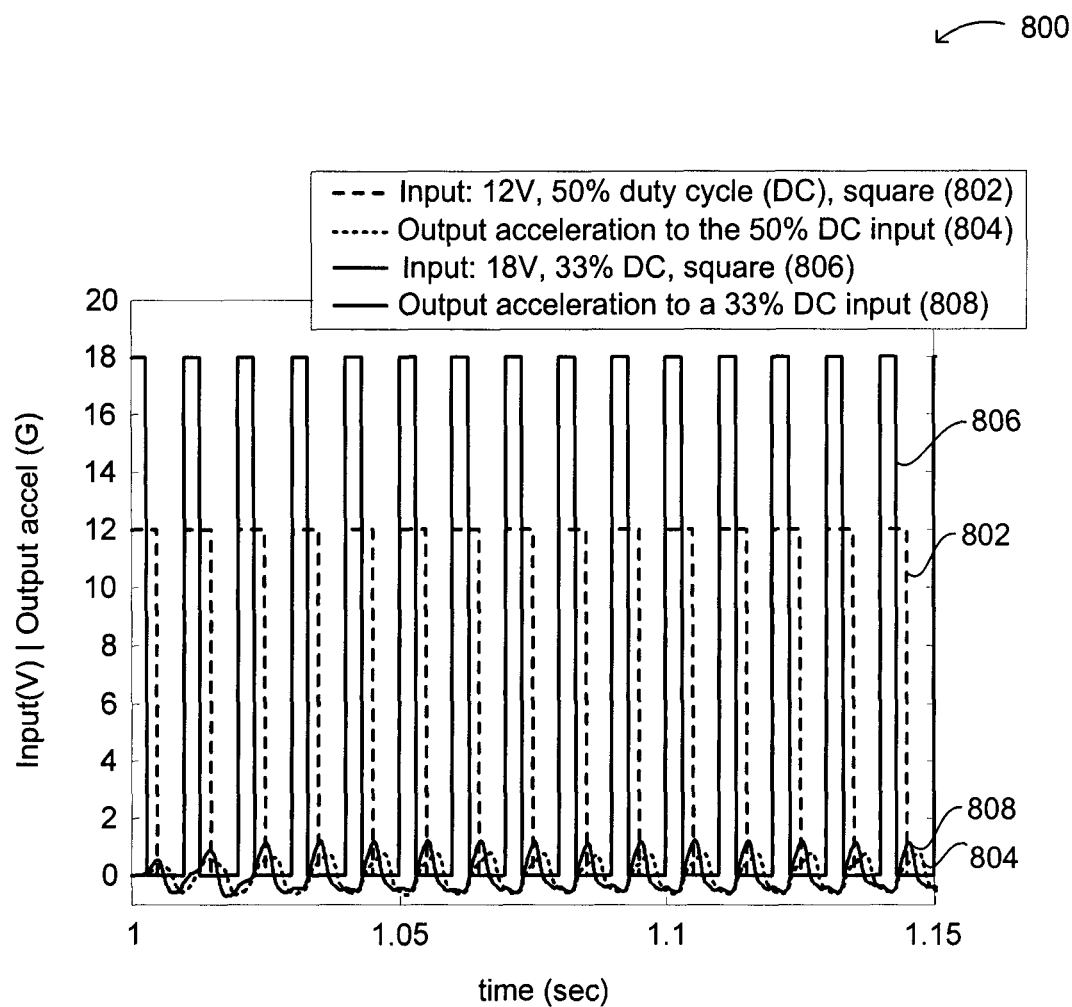
FIG. 8 shows a graphical representation of an example of continuous vibration operation in accordance with exemplary embodiments of the present invention.

FIG. 8 shows a graphical representation of an example of continuous vibration operation in accordance with embodiments of the present invention. Generally, an intrinsic unidirectional driving feature of an actuator may not facilitate generation of continuous vibrations with a "maximum" voltage (e.g., about 24 V) and a 50% periodic signal duty cycle. This is because the actuator reaches a state where the spring cannot return fast enough, thus keeping the actuator substantially in a closed position, and the spring in a loaded state. In the example shown in FIG. 8, the input 802 driving a high level voltage can be reduced (e.g., to about 12 V) until the system is balanced to allow the spring force to move back (unloading) and forth (solenoid compressing the spring) for generating a desired vibration and frequency (e.g., corresponding output signal 804). In another example for generating continuous vibrations, the control signal (e.g., input signal 806) duty cycle can be reduced (e.g., to about 33%), along with the driving voltage (e.g., reduced to about 18 V) to give corresponding output acceleration 808. The duty cycle can be suitably varied in order to give different haptic effects.

Particular embodiments include various processing steps, examples of which will be described below. Such steps may be embodied in machine or computer executable instructions. The instructions can be used to produce a general purpose or special purpose system, which is programmed with the instructions, to perform the steps of particular embodiments. Alternatively, the steps of particular embodiments may be performed by specific hardware components that contain hard-wired logic for performing the steps, or by any combination of programmed computer components and custom hardware components.

Figure 9:
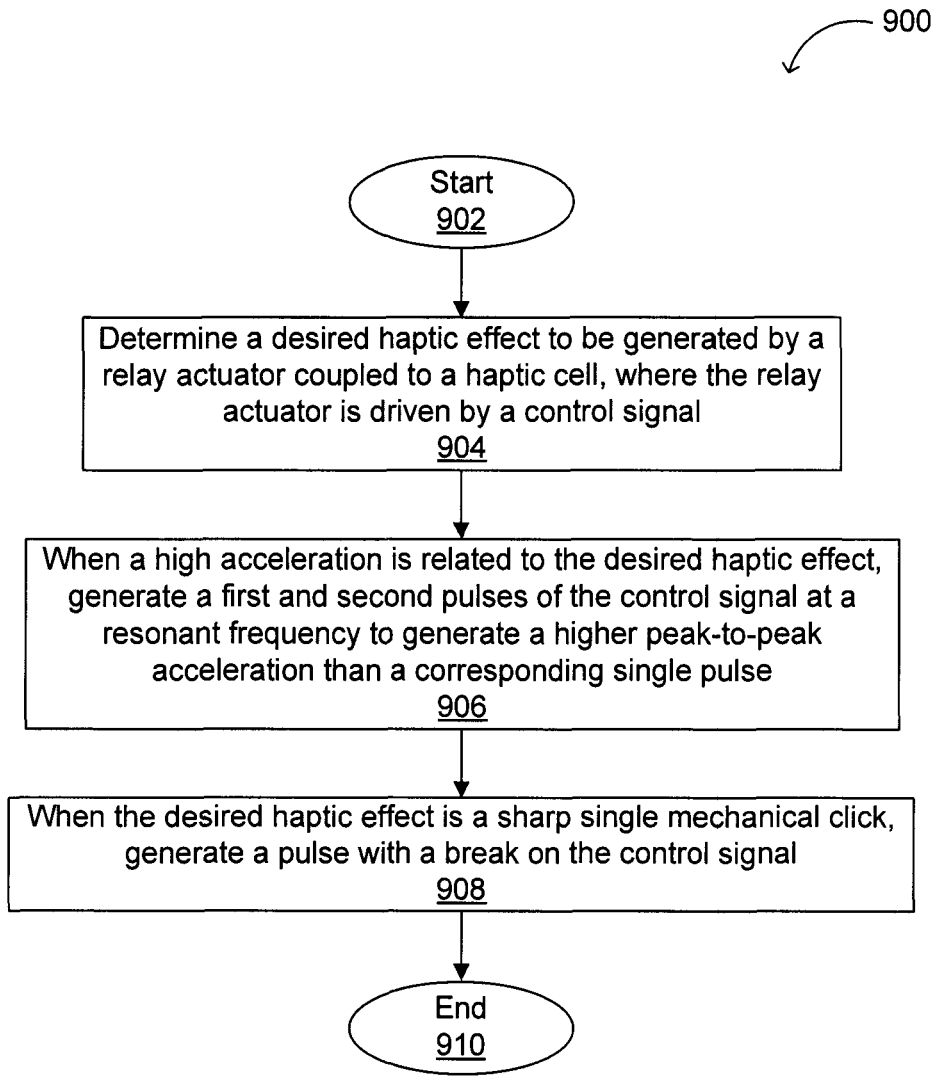
FIG. 9 shows a flow diagram of an example of method of operating actuators in accordance with exemplary embodiments of the present invention.

FIG. 9 shows a flow diagram 900 of an example of method of operating actuators in accordance with embodiments of the present invention. The flow begins (902), and a type of desired haptic effect to be generated from a haptic cell can be determined (904). For example, a relatively short mechanical button or click type of effect might be desired. When the desired haptic effect is related to an accelerated response, first and second pulses of a control signal can be generated for the actuator (906). For example, the first and second pulses may be substantially the same resonant frequency, and the second pulse can be asserted prior to a return of a metal object in the actuator when returning to a resting position. When the desired haptic effect is a sharp mechanical response (or when damping is needed), a rising edge of the control signal can be generated, followed by a braking pulse of the control signal for stopping the metal object in the actuator before the metal object naturally returns to the resting position (908), thus completing the flow (910).

Figure 10:
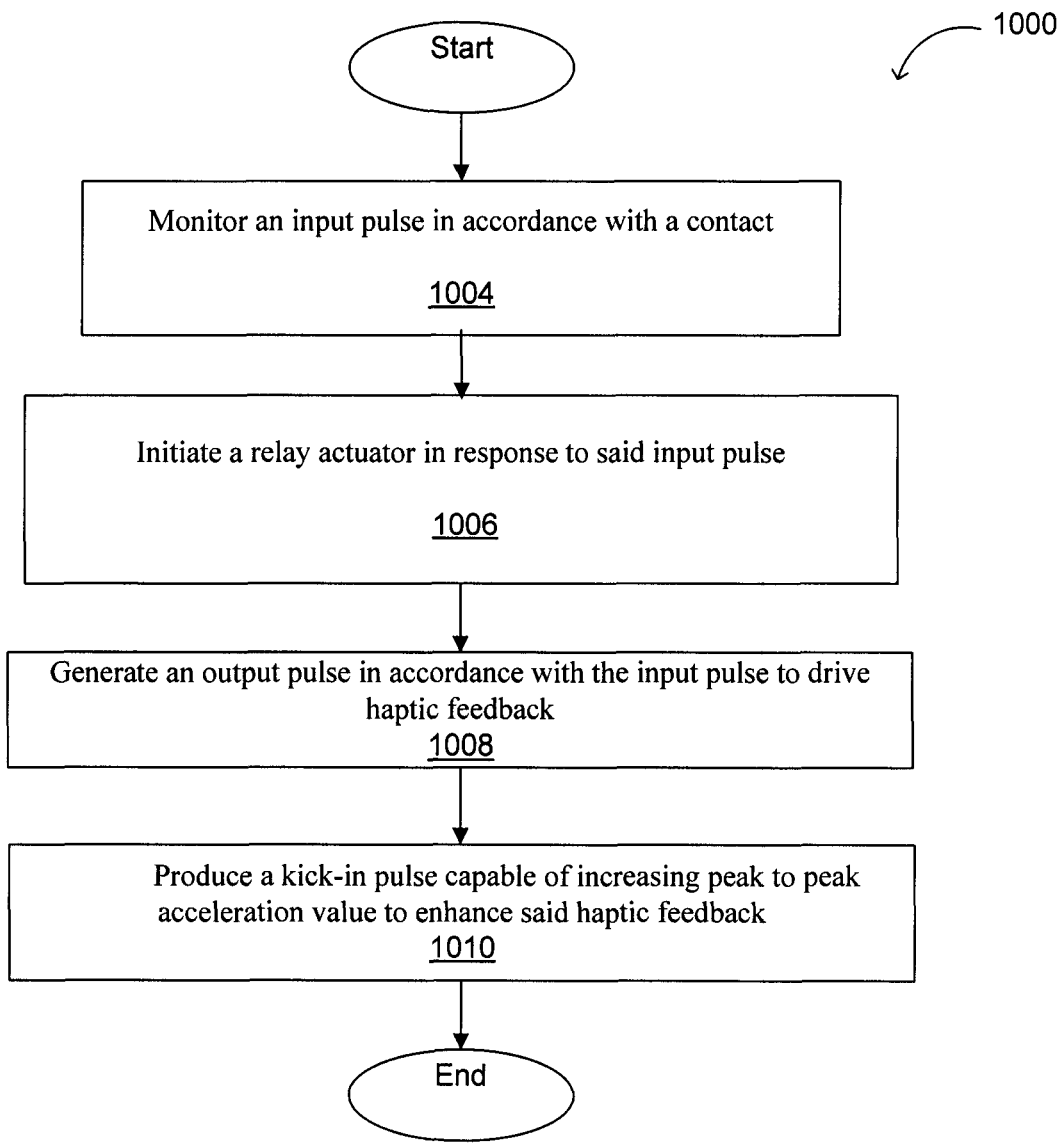
FIG. 10 shows a flow chart of a method for operating a kick-in pulse using an actuator in accordance with exemplary embodiments of the present invention.

FIG. 10 shows a flow chart 1000 of an example of method for operating a kick-in pulse using an actuator in accordance with embodiments of the present invention. At block 1004, a process capable of operating kick-in pulses monitors an input pulse in accordance with a contact. The contact is an input made by user. For example, the process is capable of detecting a contact when a user's finger depresses a haptic touch screen.

At block 1006, the process initiates an actuator in response to the input pulse. In one example, the process is capable of ascertaining whether a pulse frequency generated by the actuator matches with a predetermined pulse frequency (e.g., one generated by another actuator).

At block 1008, the process generates an output pulse in accordance with the input pulse to drive haptic feedback. For example, the process is capable of activating the actuator in accordance with the input pulse.

At block 1010, the process produces a kick-in pulse capable of increasing peak to peak acceleration value for generating crisp haptic feedback. For instance, upon detecting a depression on a tactile touch pad, an input pulse in response to the depression is generated. The process is further capable of building up momentum of haptic acceleration. It should be noted that the process can provide crisp tactile sensation in response to the input pulse proceed by the kick-in pulse. Alternatively, the process can provide crisp tactile sensation in response to the input pulse followed by the kick-in pulse.

Figure 11:
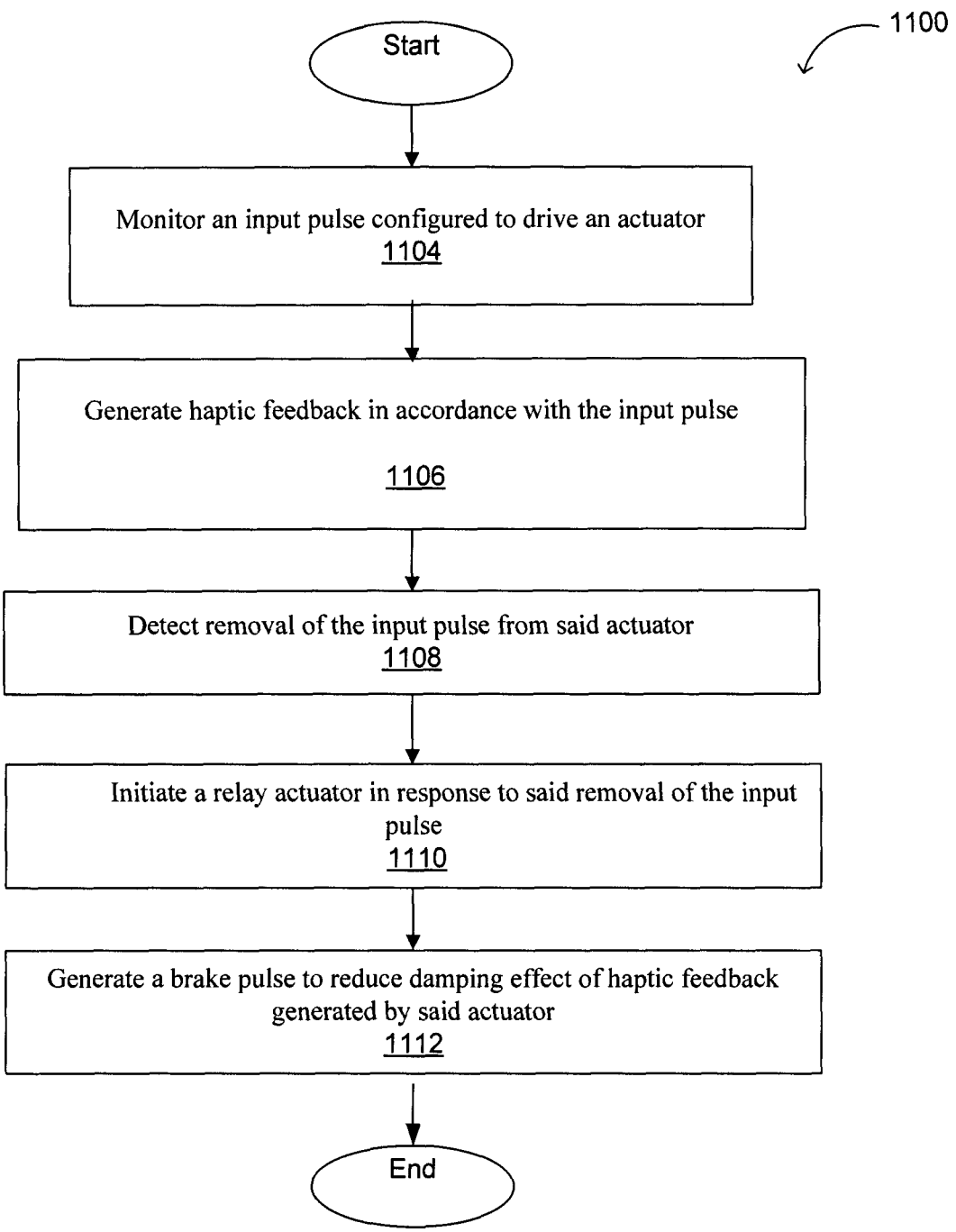
FIGS. 11 and 12 show flow charts of methods for operating a brake pulse portion using an actuator in accordance with exemplary embodiments of the present invention.

FIG. 11 shows a flow chart 1100 of an example of method for operating a brake pulse using an actuator in accordance with embodiments of the present invention. At block 1104, a process capable of providing a brake pulse monitors an input pulse configured to drive an actuator.

At block 1106, the process generates haptic feedback in accordance with the input pulse. For example, the process is capable of activating the actuator to generate a predefined haptic feedback in accordance with the input pulse.

At block 1108, the process is capable of detecting removal of the input pulse from the actuator. For example, the input pulse is deactivated.

At block 1110, the process initiates an actuator in response to the removal of the input pulse. In one embodiment, the process ascertains that the pulse frequency generated by the actuator is similar to pulse frequency generated by an actuator.

At block 1112, the process generates a brake pulse to reduce damping effect of haptic feedback generated by the actuator. The process is further capable of detecting a depression on a tactile touch pad and generating the input pulse in response to the depression. For instance, upon detecting a depression on a tactile touch pad, the process further includes detecting a contact between a finger and a haptic touch screen. In one embodiment, the process can also release actuator slowly to decrease damping sensation.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of this invention.

What is claimed is:

1. A method for generating haptic feedback, comprising:
   detecting an input indicative of a contact at a touch sensitive surface;
   applying a first pulse followed by a second pulse to a terminal of an actuator in response to the input, wherein the first pulse is a kick-in pulse configured to cause acceleration of a moveable mass of the actuator, wherein the second pulse is applied to the terminal of the actuator before the moveable mass returns to a resting position, wherein the first pulse and the second pulse have the same polarity at the terminal of the actuator, and wherein the second pulse comprises a driving portion immediately followed by a brake pulse portion, wherein the driving portion of the second pulse is also configured to cause acceleration of the moveable mass and has a constant first nonzero voltage level for a first nonzero duration, and
   wherein the brake pulse portion comprises a ramp down portion, and wherein the first pulse and the second pulse are separated by a second nonzero duration, in which 0 V is applied to the actuator, and wherein acceleration of the moveable mass that is caused by the first pulse and the second pulse is greater relative to acceleration caused by a single pulse.

2. The method of claim 1, wherein detecting the input comprises detecting, with a pressure sensor or a capacitive sensor, a depression on the touch sensitive surface.

3. The method of claim 2, wherein detecting the depression on the touch sensitive surface further includes detecting a contact between a finger and the touch sensitive surface.

4. The method of claim 1, wherein the constant first nonzero voltage level and a constant second nonzero voltage level have the same polarity, and the constant second nonzero voltage level is half of the constant first nonzero voltage level.

5. The method of claim 1, wherein the actuator is a solenoid that comprises a coil and a biasing component, wherein the coil is configured to actuate the moveable mass, and the biasing component is configured to bias the moveable mass to the resting position.

6. The method of claim 1, wherein the brake pulse portion comprises a first portion that immediately follows the driving portion and has a constant second nonzero voltage level that is at a lower magnitude than the constant first nonzero voltage level, and wherein the ramp down portion immediately follows the first portion and ramps down from the constant second nonzero voltage level.

7. The method of claim 6, wherein the constant second nonzero voltage level immediately follows the constant first nonzero voltage level.

8. The method of claim 1, wherein the haptic feedback simulates a mechanical click, and wherein the first pulse and the second pulse are the only pulses used to simulate the mechanical click.

9. The method of claim 1, wherein the resting position is an original position of the moveable mass when no power is applied to the actuator, such that the second pulse is applied before the moveable mass returns to the original position.

10. A haptic interface system, comprising:
    an actuator; and
    a controller configured to apply a first pulse followed by a second pulse to a terminal of the actuator, wherein the first pulse and the second pulse have the same polarity at the terminal of the actuator, wherein the first pulse has a first rising edge and is a kick-in pulse configured to cause acceleration of a moveable mass of the actuator, wherein the second pulse is applied to the terminal of the actuator before the moveable mass returns to a resting position, the second pulse having a driving portion and a brake pulse portion, the driving portion having a constant first nonzero voltage level for a first nonzero duration for the actuator such that haptic effects are generated from the haptic interface system, wherein the controller is configured to generate the second pulse by:
    generating a second rising edge of the driving portion of the second pulse for moving the moveable mass of the actuator; and
    generating the brake pulse portion of the second pulse for stopping the moveable mass of the actuator before the moveable mass of the actuator naturally returns to the resting position, the brake pulse portion comprising a ramp down portion, wherein the first pulse and the second pulse are separated by a second nonzero duration, in which 0 V is applied to the actuator, and wherein acceleration of the moveable mass that is caused by the first pulse and the second pulse is greater relative to acceleration caused by a single pulse,
    wherein the brake pulse portion comprises a partial discharge of the driving portion of the second pulse from the constant first nonzero voltage level to a constant second nonzero voltage level for a third nonzero duration, the constant first nonzero voltage level of the driving portion and the constant second nonzero voltage level of the brake pulse portion also having the same polarity.

11. The haptic interface system of claim 10, wherein the second rising edge of the driving portion of the second pulse has a range between 0 and 30 volts.

12. The haptic interface system of claim 10, wherein the haptic effects generate haptic sensation imitating mechanical clicks.

13. The haptic interface system of claim 10, wherein the ramp down portion of the brake pulse portion starts after the third nonzero duration, and ramps down from the constant second nonzero voltage level to zero.

14. The haptic interface system of claim 13, wherein a slew rate of the ramp down portion is about 0.24 V/ms.

15. A method of controlling an actuator for a haptic interface system, the method comprising:
    determining a type of desired haptic effect to be generated from the haptic interface system; and
    in response to determining that the type of desired haptic effect is a mechanical click:
    applying only a first pulse followed by a second pulse to a terminal of the actuator, wherein the first pulse and the second pulse have the same polarity at the terminal of the actuator, wherein the first pulse has a first rising edge and is a kick-in pulse configured to cause acceleration of a metal object of the actuator, wherein the first pulse and the second pulse are substantially at a resonant frequency of the actuator, and wherein the second pulse is applied to the terminal of the actuator prior to a return of the metal object in the actuator to a resting position, and the second pulse has a driving portion with a second rising edge and a constant first nonzero voltage level for a first nonzero duration, wherein the driving portion is immediately followed by a braking pulse portion of the second pulse for stopping the metal object in the actuator before the metal object naturally returns to the resting position, the braking pulse portion including i) a first portion that immediately follows the driving portion, and is at, for a second nonzero duration, a constant second nonzero voltage level that is at a lower magnitude than the constant first nonzero voltage level and ii) a ramp down portion that immediately follows the first portion and that ramps down from the constant second nonzero voltage level.

16. The method of claim 15, wherein applying the braking pulse portion comprises partially reducing a voltage level of the second pulse from the constant first nonzero voltage level to the constant second nonzero voltage level for the second nonzero duration, the constant first nonzero voltage level and the constant second nonzero voltage level having the same polarity.

17. A haptic interface system for generating haptic feedback, comprising:
an actuator having a moveable mass;
a sensor configured to detect an input indicative of a contact at a touch sensitive surface of the haptic interface system;
a control circuit configured to apply a first pulse followed by a second pulse to a terminal of the actuator in response to the input, wherein the first pulse and the second pulse have the same polarity at the terminal of the actuator, wherein the first pulse has first rising edge and is a kick-in pulse configured to cause acceleration of the moveable mass of the actuator, wherein the second pulse is applied to the terminal of the actuator before the moveable mass returns to a resting position, and wherein the second pulse comprises a driving portion immediately followed by a brake pulse portion, wherein the driving portion of the second pulse is also configured to cause acceleration of the moveable mass and has a constant first nonzero voltage level for a first nonzero duration, wherein the brake pulse portion of the second pulse comprises a ramp down portion, and wherein the first pulse and the second pulse are separated by a second nonzero duration, in which 0 V is applied to the actuator, and wherein acceleration of the moveable mass that is caused by the first pulse and the second pulse is greater relative to acceleration caused by a single pulse.

18. The haptic interface system of claim 17, wherein the sensor is configured to detect a depression on the touch sensitive surface.

* * * * *